US005664019A

United States Patent [19]

Wang et al.

[11] Patent Number: 5,664,019

[45] Date of Patent: Sep. 2, 1997

[54] SYSTEMS FOR FEEDBACK CANCELLATION IN AN AUDIO INTERFACE GARMENT

[75] Inventors: Weijia Wang, Sunnyvale; James H. Boyden, Los Altos Hills, both of Calif.

[73] Assignee: Interval Research Corporation, Palo Alto, Calif.

[21] Appl. No.: 385,760

[22] Filed: Feb. 8, 1995

[51] Int. Cl.$^{6}$ .......................... G10K 11/16; H04B 15/00; H04R 27/00

[52] U.S. Cl. .......................... 381/71.1; 379/390; 381/66; 381/83; 381/93

[58] Field of Search .......................... 381/71, 66, 83, 381/93; 379/388, 389, 390, 410

[56] References Cited

U.S. PATENT DOCUMENTS

| | | | |
|---|---|---|---|
| 4,683,590 | 7/1987 | Miyoshi et al. . | |
| 4,860,364 | 8/1989 | Giannini | 381/90 |
| 4,998,241 | 3/1991 | Brox et al. . | |
| 5,033,082 | 7/1991 | Eriksson et al. | 381/71 |
| 5,216,722 | 6/1993 | Popovich | 381/71 |
| 5,323,458 | 6/1994 | Park et al. . | |
| 5,323,459 | 6/1994 | Hirano . | |
| 5,371,789 | 12/1994 | Hirano . | |
| 5,396,554 | 3/1995 | Hirano et al. | 379/410 |

FOREIGN PATENT DOCUMENTS

| | | |
|---|---|---|
| 1-114150 | 5/1989 | Japan . |
| 2220546 | 10/1990 | United Kingdom . |

OTHER PUBLICATIONS

Widrow, B & Stearns, SD, "Adaptive Signal Processing", pp. 2–43 and 97–187.

*Primary Examiner*—Forester W. Isen

*Attorney, Agent, or Firm*—Brooks & Kushman

[57] ABSTRACT

An audio interface garment includes systems for attenuating the influence of sound waves generated by audio output devices on output signals from a plurality of input devices an. In one embodiment, input signals which are applied to the audio output devices are combined by a mixer to form a mixed audio signal. A plurality of Widrow-Hoff least mean square adaptive filters each form a corresponding filtered signal based upon the mixed audio signal and the output signal from a corresponding one of the input devices. A plurality of processed signals are formed by differencing each filtered signal from the corresponding output signal. The weight values of the adaptive filters are modified according to the least mean square method. The processed signals provide signals in which the first sound waves are attenuated.

20 Claims, 4 Drawing Sheets

SYSTEMS FOR FEEDBACK CANCELLATION IN AN AUDIO INTERFACE GARMENT

TECHNICAL FIELD

The present invention relates to methods and systems for feedback cancellation in an audio interface for a personal communication system.

BACKGROUND OF THE INVENTION

Portable, personal communication systems, such as cellular telephones and cordless telephones, are currently experiencing a dramatic growth in utilization. Cellular telephones, for example, have enabled users to transcend the constraints of fixed telephony by allowing communication outside of buildings. In accordance with such trends, society may witness a significant trend in both personal and professional wireless communications which will change the way people conduct their lives at home, on the road, and at work.

Personal communication systems generally include a transmitter-receiver pair along with an audio output device and an audio input device. The audio output device typically comprises speakers, headphones, earphones, or the like. In general terms, audio output devices for use with a personal communication system are devices capable of producing sound waves representative of an electronic audio signal applied thereto. The audio input device typically comprises a microphone or a like transducer. The audio input device is capable of producing an electronic signal representative of sound waves received thereby.

A garment-based audio interface for a personal communication system is disclosed in a copending application Ser. No. 08/280,185, which is incorporated herein by reference. The garment-based audio interface contains an array of microphones and an array of speakers mounted to a garment member near the neck opening. The garment-based interface is advantageous in that a hand of a user is not required for holding the interface (such as with a traditional telephone handset), the speakers are not pressing against the ears or skull of the user (such as with headphones), and the interface is socially appropriate.

As a result of locating the speakers in proximity to the microphones, sound waves generated by the speakers are received by the microphones, and transmitted by the transmitter. Also, the possibility exists for leakage of the signal from the microphones to the speakers due to cross talk between two signal paths. Consequently, an audio oscillation may occur in the interface. The threshold of the oscillation limits the maximum volume which can be produced by the speakers. In practice, this maximum volume may be too low for the required application.

SUMMARY OF THE INVENTION

It is an object of the present invention to reduce the influence of the sound waves generated by the audio output device on the output signals generated by the audio input device in a garment-based audio interface apparatus.

A further object of the present invention is to effectively eliminate oscillations which occur due to the proximity of the audio output device and the audio input device in a garment-based audio interface.

Another object of the present invention is to eliminate oscillations in a garment-based audio interface at a low cost.

An additional object of the present invention is to eliminate oscillations in a garment-based audio interface using standard digital signal processing integrated circuits.

In carrying out the above objects, the present invention provides a system for attenuating the influence of sound waves generated by a plurality of audio output devices on a corresponding output signal from each of a plurality of audio input devices in a garment-based audio interface apparatus. The system includes a plurality of adaptive processors, wherein each of the adaptive processors is coupled to a corresponding one of the audio input devices. Each of the adaptive processors forms a corresponding processed signal based upon the output signal from the corresponding one of the audio input devices and based upon at least one of a plurality of input signals applied to the plurality of audio output devices, wherein the influence of the first sound waves is attenuated in each corresponding processed signal.

Further in carrying out the above objects, the present invention provides a system for attenuating the influence of sound waves generated by N audio output devices on a corresponding output signal from each of M audio input devices in a garment-based audio interface apparatus. A mixer combines a plurality of N input signals, which are applied to the N audio output devices, to form a mixed audio signal. M adaptive filters are each coupled to the mixer and a corresponding one of the M audio input devices. Each of the M adaptive filters forms a corresponding filtered signal based upon the mixed audio signal, wherein a corresponding processed signal is formed for each of the M adaptive filters by a difference between the output signal from the corresponding one of the audio input devices and the corresponding filtered signal, and wherein each of the M adaptive filters is adapted in dependence upon the corresponding processed signal. As a result, the influence of the first sound waves is attenuated in each corresponding processed signal.

Still further in carrying out the above objects, the present invention provides a system for attenuating the influence of sound waves generated by N audio output devices on a corresponding output signal from each of M audio input devices in a garment-based audio interface apparatus. M×N adaptive filters are arranged in M banks of N adaptive filters. Each of the N adaptive filters within each bank forms a corresponding filtered signal based upon a corresponding one of a plurality of N input signals, wherein the N input signals are applied to the N audio output devices. A corresponding processed signal is formed for each of the M banks by a difference between the output signal from a corresponding one of the M audio input devices and a sum of the N corresponding filtered signals. Each of the N adaptive filters within each bank is adapted in dependence upon the corresponding processed signal, wherein the influence of the first sound waves is attenuated in each corresponding processed signal.

These and other features, aspects, and advantages of the present invention will become better understood with regard to the following description, appended claims, and accompanying drawings.

BEST MODES FOR CARRYING OUT THE INVENTION

The present invention overcomes the above-mentioned disadvantages by employing adaptive filters to attenuate the effect of the sound waves emitted by an audio output device. More specifically, audio signals applied to the audio output devices are modified adaptively in real time to mimic the corresponding components in the signals produced by the audio input devices. The resulting filtered signals are then effectively subtracted from the signals produced by the audio input devices. As a result, the feedback signal components are reduced and audio oscillations are avoided for high volume levels produced by the audio output devices.

Figure 1:
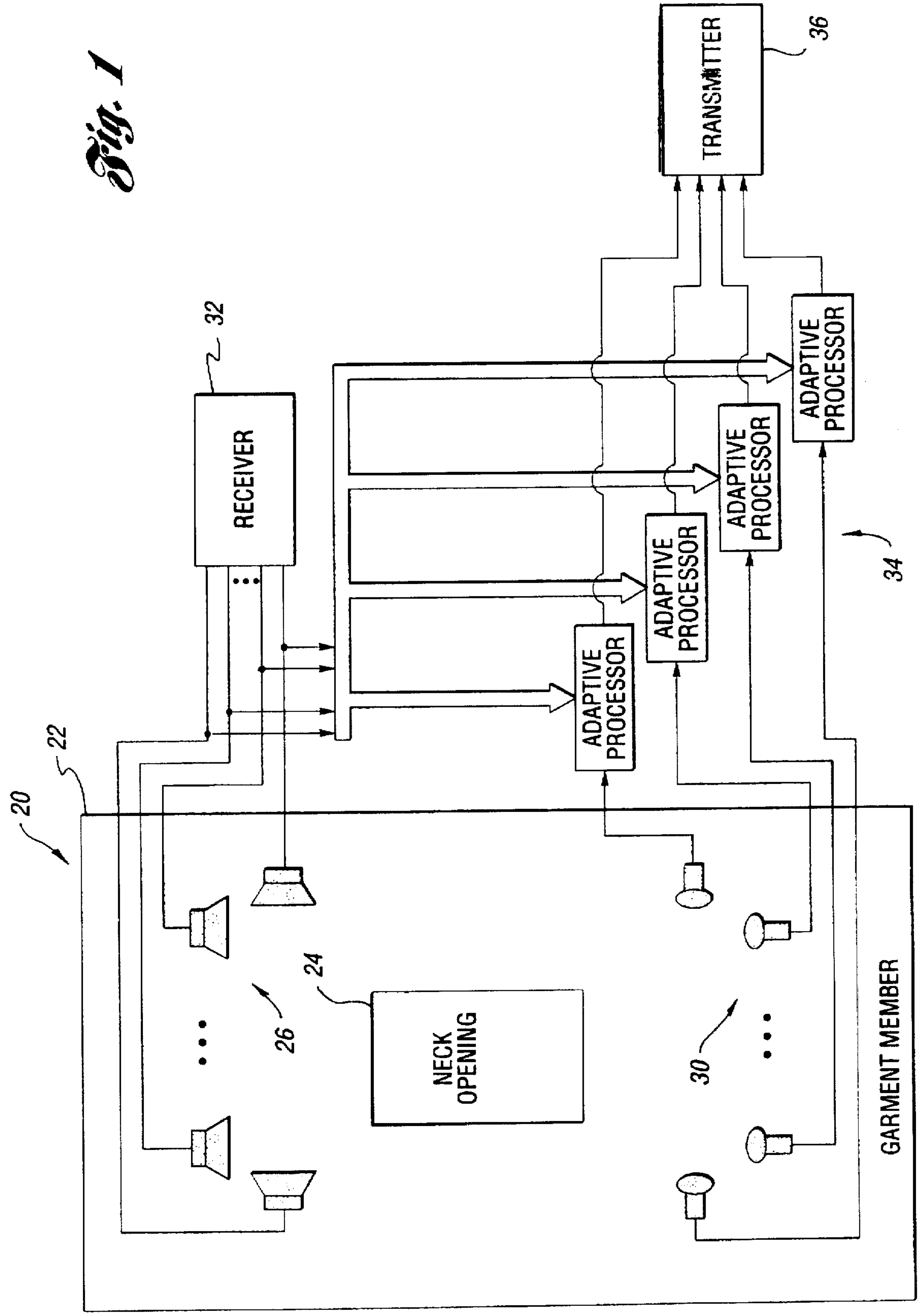
FIG. 1 is a schematic, block diagram of an embodiment of a personal communication system having a garment-based audio interface apparatus in accordance with the present invention.

An embodiment of a personal communication system having a garment-based audio interface apparatus with feedback cancellation is illustrated in FIG. 1. The communication system comprises a garment-based audio interface, indicated generally by reference numeral 20. The interface 20 contains a garment member 22 which is worn on the upper torso of a user. The garment member 22 includes a neck opening 24 which allows extension therethrough of the neck of the person. The garment member 22 can be embodied by a human wearable such as a shirt, which includes a T-shirt or a sweatshirt, a vest, a jacket, or a necklace.

The garment-based audio interface further contains a plurality of audio output devices 26 secured to the garment member 22 and located adjacent the neck opening 24. Each of the audio output devices 26 is capable of emitting sound waves representative of an input signal applied thereto. The audio output devices 26 can be embodied by an array of speakers or like transducers. In general, the audio output devices are located so as not to cover the ears of a user (as a headphone does), nor block the ear canals of the user (as an earphone or hearing aid does), nor apply forces to the human body which can cause discomfort. This way, the user perceives the maximum naturalness of the auditory spaces received remotely.

The garment-based audio interface 20 also contains a plurality of audio input devices 30 secured to the garment member 22 and located adjacent the neck opening 24. Each of the audio input devices 30 is capable of generating an output signal representative of sound waves received thereby. The audio input devices 30 can be embodied by an array of microphones or like transducers. In practice, at least two of the audio input devices 30 are located near the two corresponding ears of the user so that the acoustic effect of the head is fully incorporated in capturing the sound waves. The remainder of the audio input devices 30 are distributed around the neck and two shoulders, and can be supported and aesthetically blended into the human wearable such as within a collar, a shawl, a necklace, or eyeglasses.

The communication system further includes a receiver 32 capable of producing a plurality of audio signals. The receiver 32 is coupled to the audio output devices 26 such that the audio signals generated by the receiver 32 act as input signals for the audio output devices 26. The receiver is preferably capable of controlling the amplitude and phase of the input signals in order to provide a spatialized auditory environment for the user.

The receiver 32 can be of the form of a receiving antenna and a demodulator, such as in a portable personal radio. The receiver 32 can be located physically external to the garment member, such as on a belt pack to be worn on the waist of the user. The receiver can be formed using either a custom-designed receiver, or a more conventional receiver such as one employed in a cellular telephone or a cordless telephone.

The receiver 32 is also coupled to a plurality of adaptive processors 34. Each of the adaptive processors 34 is coupled to a corresponding one of the audio input devices 30. In operation, each of the adaptive processors 34 forms a corresponding processed signal based upon the output signal generated by the corresponding one of the audio input devices and based upon the audio signals generated by the receiver 32. The processed signals formed by the adaptive processors 34 are such that the influence of the sound waves generated by the audio output devices 26 is attenuated in relation to other sound waves generated in proximity to the audio input devices 30.

More specifically, each of the adaptive processors 34 acts to modify a transfer function of a filter to which the input signals of the audio output devices 26 are applied. The transfer function is modified in order to mimic the feedback components received by the audio input devices 30. Since the feedback components are affected by the attenuation, reflection, and propagation characteristics of the sound waves traveling from the audio output devices 26 to the audio input devices 30, all of which are unknown and varying, the transfer function is modified by an adaptive process. Examples of conditions which cause such changes in the feedback components and which cause the filters to adapt rapidly in real time include: (i) shifts in the relative positions of the audio input devices 30 and the audio output devices 26 due to movements of either the garment member 22 or the wearer, or (ii) changes in the environment, e.g. wall reflections and room acoustics, as the wearer moves around.

Once an adaptively filtered signal is obtained in real time, the adaptive processors 34 follow by effectively subtracting the adaptively filtered signal from the output signal from the audio input devices 30 to form the processed signals. As a result, the influence of the sound waves generated by the audio output devices is reduced in the processed signals.

A transmitter 36, which is coupled to the adaptive processors 34, is also included in the communication system. The transmitter 36 transmits a signal in dependence upon the processed signals provided by the adaptive processors. The transmitter 36 is preferably capable of electronically controlling the amplitude and phase of the processed signals in order to selectively capture acoustic sources in 3-D space by changing the effective directivity of the audio input devices 30.

In a preferred embodiment, the transmitter 36 includes a radio frequency modulator and an antenna. The transmitter 36 can be formed using a custom-designed transmitter such as a custom FM transmitter, a custom-designed digital radio capable of transmitting a plurality of audio streams, or a more conventional transmitter such as one employed in a cellular telephone or a cordless telephone. In a similar manner as with the receiver 32, the transmitter 36 can be physically located external to the garment member, such as on a belt pack.

Figure 2:
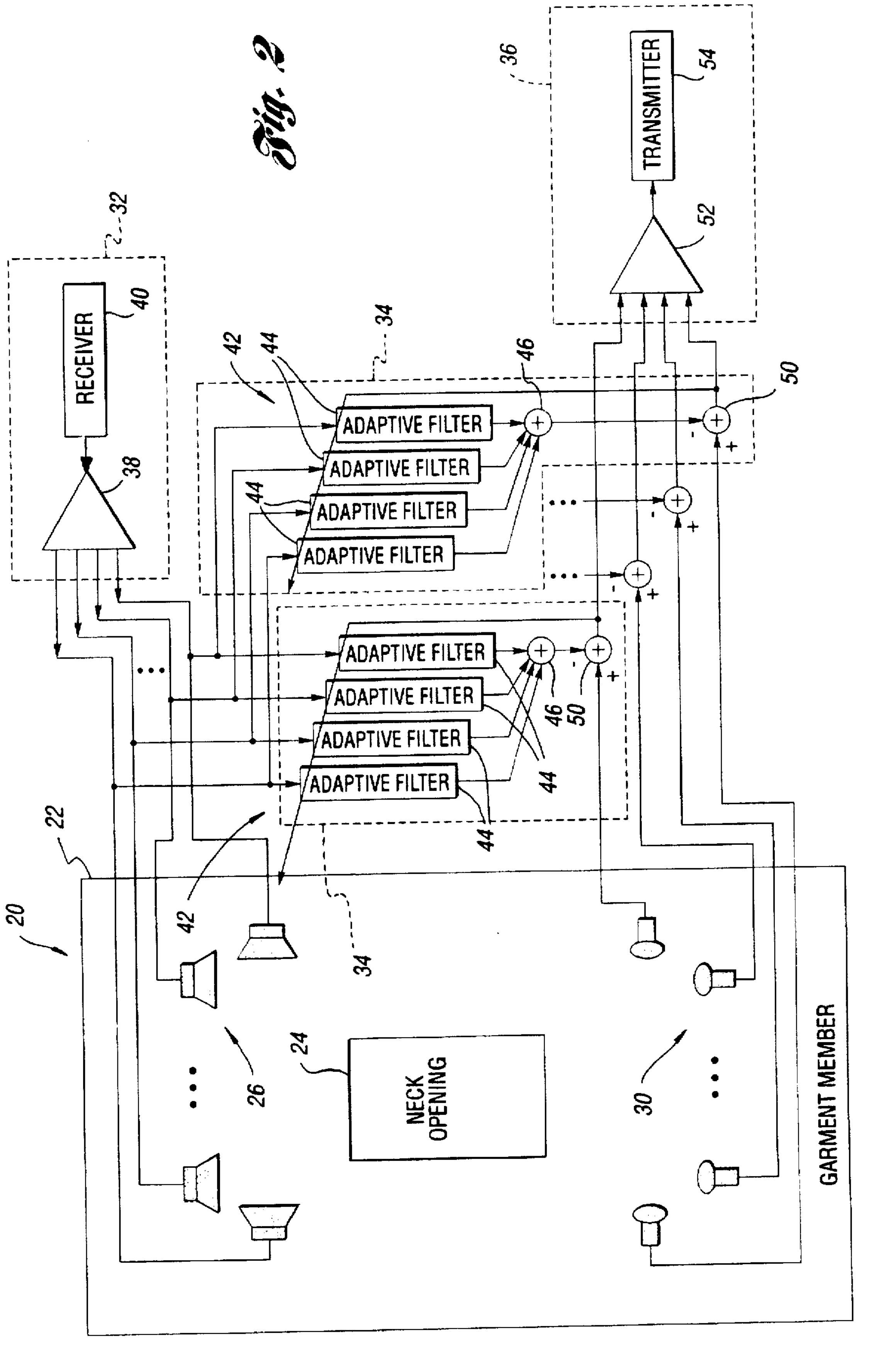
FIG. 2 is a schematic, block diagram of an embodiment of a feedback cancellation system in accordance with the present invention.

A block diagram of an embodiment of a feedback cancellation system in accordance with the present invention is illustrated in FIG. 2. In order to aid in the description of this embodiment, the variable N is used to represent the number of audio output devices 26 and the variable M is used to represent the number of audio input devices 30 employed in the garment-based audio interface. N input signals are provided to the N audio output devices 26 by a demultiplexer 38 coupled to a receiver 40, wherein each of the N input signals is provided to a corresponding one of the N audio output devices 26. Each of the M adaptive processors 34 includes a bank 42 of N adaptive filters 44, wherein each of the N adaptive filters 44 is responsive to a corresponding one of the N input signals. As a result, each of the N adaptive filters 44 within each bank 42 forms a corresponding filtered signal based upon the corresponding one of the N input signals. The N filtered signals formed within each bank are mixed by a representative mixing element 46. The mixing element 46 provides a signal representative a sum of the N filtered signals as an output. A representative differencing element 50 forms a signal representative of a difference between the output signal from a corresponding one of the M audio input devices 30 and the sum of the N filtered signals.

The output of the differencing element 50, which provides a processed signal for the adaptive processor 34, is fed back to each of the N adaptive filters 44 within the bank 42 in order to adapt each transfer function in dependence thereupon. More specifically, the characteristic of each of the N adaptive filters 44 is dynamically changed so that each corresponding filtered signal maximally resembles the signal components produced by the output signal of the corresponding one of the audio input devices 30.

The M processed signals formed by the M adaptive processors are applied to a multiplexer 52. The multiplexer 52 multiplexes the M processed signals for application to a transmitter 54. Various schemes for simultaneously transmitting one or more signals, such as time division multiplexing and frequency division multiplexing, are well known in the art of communications.

Figure 3:
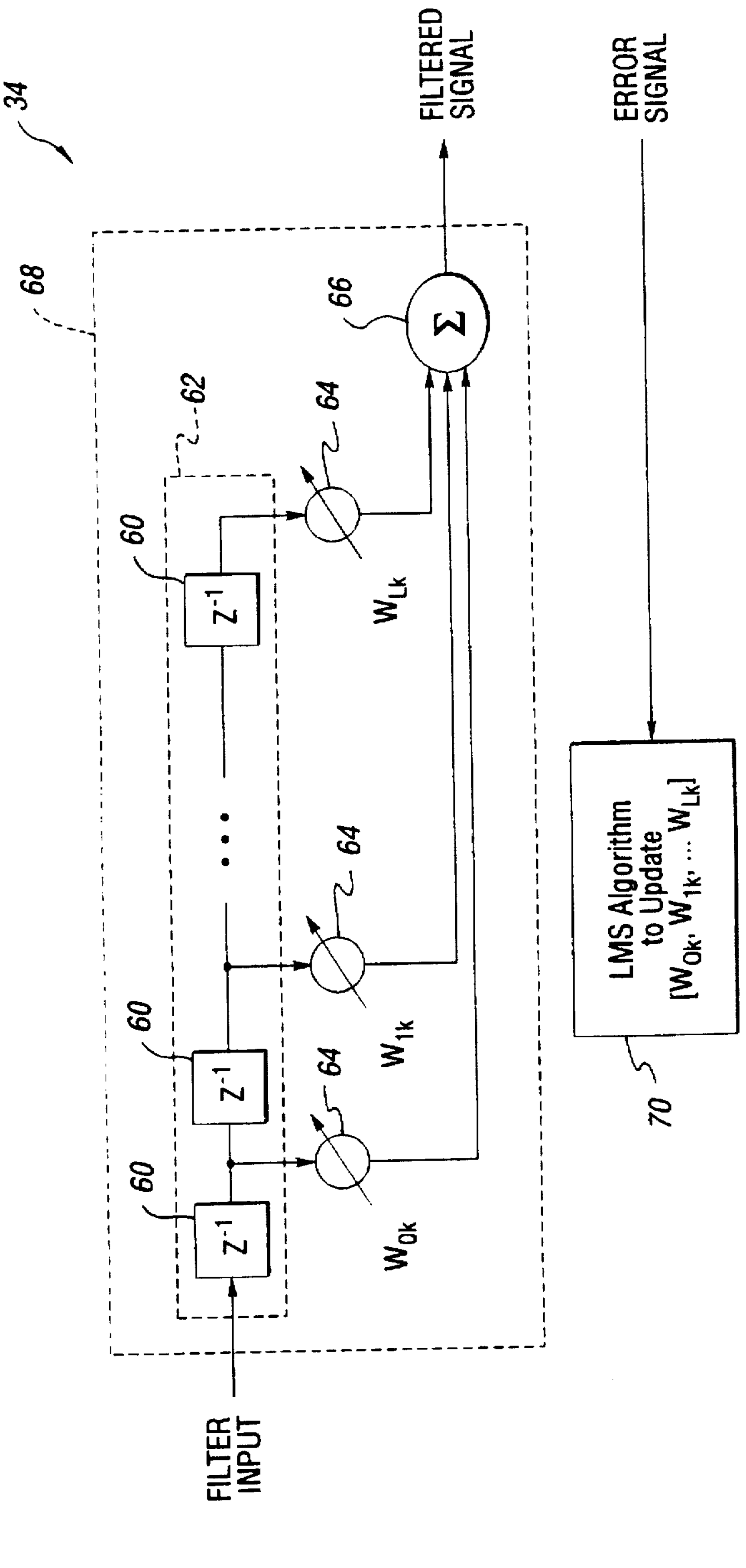
FIG. 3 is a block diagram of an embodiment of an adaptive filter in accordance with the present invention.

An embodiment of a representative one of the adaptive filters 44 in accordance with the present invention is illustrated by the block diagram in FIG. 3. The adaptive filter 44 is based upon a Widrow-Hoff least mean square (LMS) adaptive filter. Each adaptive filter 44 includes a plurality of time delay elements 60, each having an input and an output. The time delay elements 60 are cascaded in series to form a tapped delay line 62. The output of each of the time delay elements is applied to a corresponding one of a plurality of multipliers 64. Each of the multipliers 64 multiplies the output of the corresponding time delay elements by a corresponding weight value, and produces an output signal representative thereof. The multipliers 64 are coupled to a summing element 66 which sums the output signals. The combination of the time delay elements 60, the multipliers 64, and the summing element 66 form an adaptive linear combiner 68, as is well known in the art of signal processing.

The weight values, represented by the variables W0k, W1k, . . . , WLk, are modified by a weight adjuster 70 in order to optimize a predetermined measure of an error signal applied thereto. When used with the embodiment of FIG. 2, the error signal is provided by the output of the differencing element 50. In a preferred embodiment, the weight adjuster 70 modifies the weight values in order to minimize a mean-square value, or similarly the average power of the error signal. Many approaches can be taken to perform this optimization of the predetermined measure. One procedure is based upon a gradient search, wherein the gradient of the predetermined measure is determined or estimated, and the weight values are modified in a direction opposite to the direction of the gradient. Methods of performing the gradient search include Newton's method and the steepest descent method, as are well known in the art.

A preferred embodiment of the weight adjuster 70 modifies the weight values according to a least mean square (LMS) method. The LMS method is preferred because of its ease of computation and not requiring an off-line gradient estimator. A detailed discussion of the LMS method and adaptive processing is presented in the book, *Adaptive Signal Processing*, by B. Widrow and S. D. Stearns, Prentice-Hall 1985.

Figure 4:
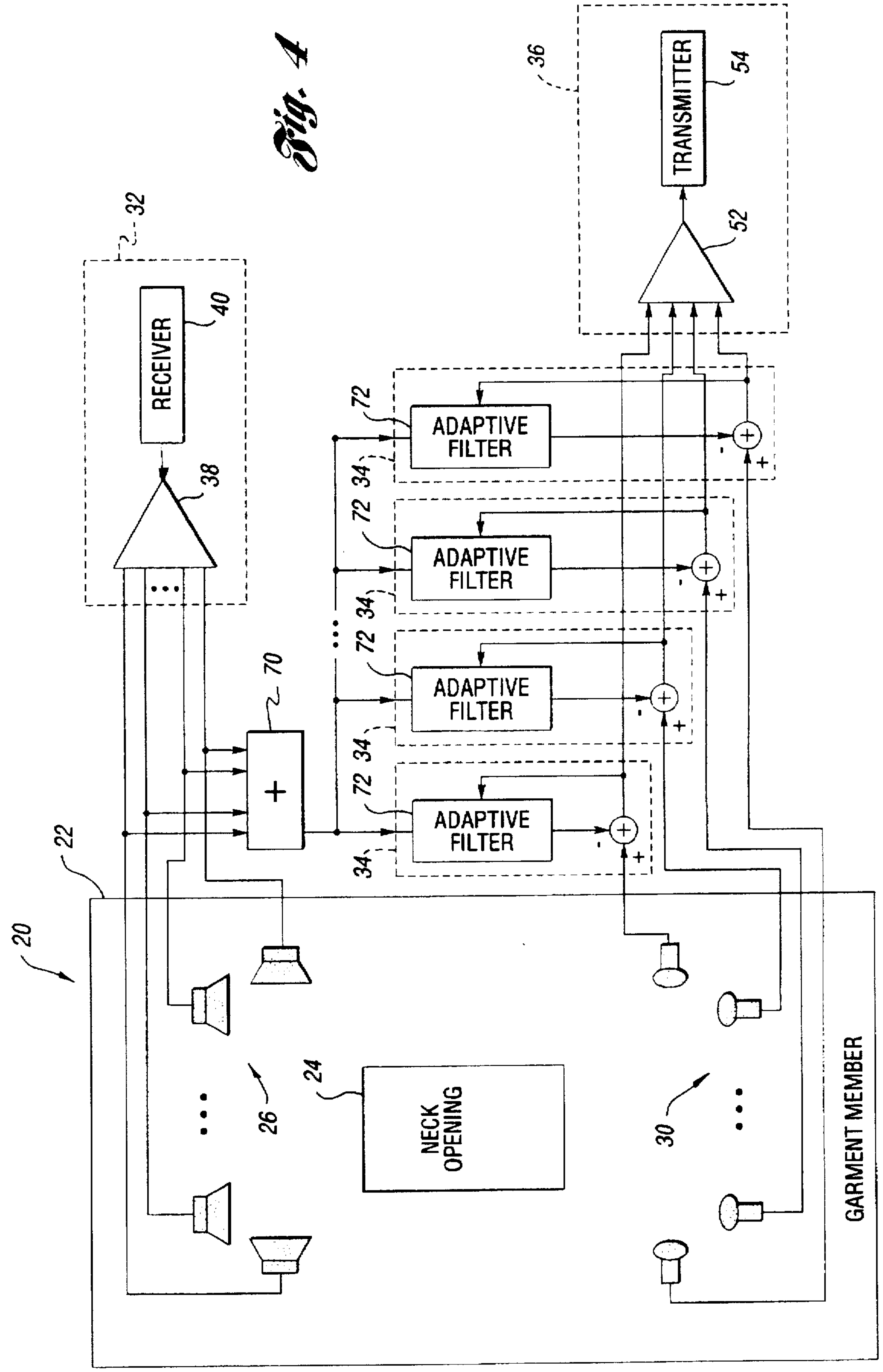
FIG. 4 is a schematic, block diagram of another embodiment of a feedback cancellation system.

In the embodiment of FIG. 2, a total of M×N adaptive filters are needed for feedback cancellation in an audio interface having N audio output devices 26 and M audio input devices 30. An embodiment of the feedback cancellation system having a reduced number of adaptive filters is illustrated in FIG. 4. As with the discussion of the embodiment of FIG. 2, the variable N is used to represent the number of audio output devices 26 and the variable M is used to represent the number of audio input devices 30 employed in the garment-based audio interface. N input signals are provided to the N audio output devices 26 by the demultiplexer 38 coupled to the receiver 40, and each of the N input signals is provided to a corresponding one of the N audio output devices 26.

Still referring to FIG. 4, the N input signals are applied to a mixer 70 which combines the N input signals to form a mixed audio signal. The mixed audio signal is applied to each of a plurality of M adaptive filters 72, representatively contained within the M adaptive processors 34. In a preferred embodiment, each of the M adaptive filters 72 is based upon the Widrow-Hoff least mean square adaptive filter illustrated in FIG. 3. Each of the M adaptive filters 72 forms a corresponding filtered signal based upon the mixed audio signal. A corresponding processed signal is formed for each of the M adaptive filters 72 by a difference between the output signal from a corresponding one of the M audio input devices and the corresponding filtered signal. The filtering characteristics of each of the M adaptive filters 72 are adapted in dependence upon the corresponding processed signal.

As with the embodiment of FIG. 2, the M processed signals formed by the M adaptive processors are applied to the multiplexer 52. The multiplexer 52 multiplexes the M processed signals for application to the transmitter 54.

Although embodiments of the present invention have been presented in which the adaptive processors 34 are based upon digital nonrecursive adaptive filters, other embodiments can be formed, for example, using recursive adaptive filters or lattice adaptive filters. Further, although the use of Widrow-Hoff LMS adaptive filters is preferred, alternative embodiments of the present invention can be formed using other adaptive filter structures and algorithms. For example, normalized least mean square filters, recursive LMS filters, lattice filters, and combinations thereof can be employed. Also, although embodiments of the present invention can be implemented economically using digital signal processing integrated circuits, a digital microprocessor can also be employed to perform the adaptive processing.

The above-described embodiments of the present invention have many advantages. Through the use of adaptive filters, the audio oscillations which occur due to the proximity of the audio input devices and the audio output devices are effectively eliminated. Moreover, standard digital signal processing integrated circuits can be employed to provide the adaptive filtering. By mixing the input signals before performing the adaptive filtering, the required number of adaptive filters is independent of the number of audio output devices employed, and is dependent only upon the number of audio input devices employed.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. An audio interface system comprising:

a garment member;

a plurality of audio output devices attached to the garment member, the plurality of audio output devices emitting first sound waves based upon a plurality of input signals applied thereto;

a plurality of audio input devices in audio proximity to the plurality of audio output devices, each of the plurality of audio input devices generating a corresponding output signal representative of second sound waves received thereby;

a plurality of adaptive processors, each of the adaptive processors coupled to a corresponding one of the plurality of audio input devices, wherein each of the adaptive processors forms a corresponding processed signal based upon the output signal from the corresponding one of the audio input devices and based upon at least one of the input signals;

wherein the influence of the first sound waves is attenuated in each corresponding processed signal.

2. The system of claim 1 further comprising a mixer which combines at least one of the input signals to form a mixed audio signal, wherein the adaptive processors are coupled to the mixer, and wherein each of the adaptive processors forms the corresponding processed signal based upon the mixed audio signal.

3. The system of claim 2 wherein each of the adaptive processors includes a corresponding adaptive filter, wherein each adaptive filter forms a corresponding filtered signal based upon the mixed audio signal.

4. The system of claim 3 wherein each adaptive filter is modified in dependence upon a difference between the output signal from the corresponding one of the audio input devices and the corresponding filtered signal.

5. The system of claim 3 wherein each corresponding processed signal is based upon a difference between the output signal from the corresponding one of the audio input devices and the corresponding filtered signal.

6. The system of claim 3 wherein each adaptive filter includes a plurality of time delay elements, each of the time delay elements having an input and an output, wherein the time delay elements are cascaded in series.

7. The system of claim 6 wherein each adaptive filter includes a plurality of multipliers, each of the multipliers coupled to the output of a corresponding one of the time delay elements to multiply the output by a corresponding weight value.

8. The system of claim 7 wherein the weight value of each multiplier within the adaptive processor is modified according to a least mean square criterion.

9. The system of claim 1 wherein each of the adaptive processors includes a corresponding plurality of adaptive filters, wherein each of the adaptive filters forms a corresponding filtered signal based upon a corresponding one of the input signals.

10. The system of claim 9 wherein each corresponding processed signal is formed in dependence upon the difference between the output signal from a corresponding one of the audio input device processors and the sum of the corresponding filtered signals.

11. The system of claim 9 wherein each of the adaptive filters within the adaptive processor is modified in dependence upon the difference between the output signal from a corresponding one of the audio input device processors and the sum of the corresponding filtered signals.

12. The system of claim 11 wherein each adaptive filter includes a plurality of time delay elements, each of the time delay elements having an input and an output, wherein the time delay elements are cascaded in series.

13. The system of claim 12 wherein each adaptive filter includes a plurality of multipliers, each of the multipliers coupled to the output of a corresponding one of the time delay elements to multiply the output by a corresponding weight value.

14. The system of claim 13 wherein the weight value of each multiplier within the adaptive processor is modified according to a least mean square criterion.

15. An audio interface system comprising:

a garment member;

N audio output devices adapted for wearing on the garment member, the N audio output devices emitting first sound waves based upon N input signals applied thereto;

M audio input devices adapted for wearing on the garment member in audio proximity to the N audio output devices, each input device generating a corresponding output signal representative of second sound waves received thereby;

a mixer which combines the N input signals to form a mixed audio signal; and

M adaptive filters, each of the M adaptive filters coupled to the mixer and a corresponding one of the M audio input devices, each of the M adaptive filters forming a corresponding filtered signal based upon the mixed audio signal, wherein a corresponding processed signal is formed for each of the M adaptive filters by a difference between the output signal from the corresponding one of the audio input devices and the corresponding filtered signal, and wherein each of the M adaptive filters is adapted in dependence upon the corresponding processed signal;

wherein the influence of the first sound waves is attenuated in each corresponding processed signal.

16. The system of claim 15 wherein the M adaptive filters includes at least one Widrow-Hoff least mean square adaptive filter.

17. The system of claim 15 wherein each of the M adaptive filters includes a corresponding Widrow-Hoff least mean square adaptive filter.

18. A garment-based audio interface system comprising:

a garment member having a neck opening;

N audio output devices disposed about the neck opening, the audio output devices emitting first sound waves based upon N input signals applied thereto;

M audio input devices disposed about the neck opening in audio proximity to the N audio output devices, the audio input devices generating a corresponding output signal representative of second sound waves received thereby; and M×N adaptive filters arranged in M banks of N adaptive filters, each of the N adaptive filters within each bank forming a corresponding filtered signal based upon a corresponding one of the N input signals, wherein a corresponding processed signal is formed for each of the M banks by a difference between the output signal from a corresponding one of the M audio input devices and a sum of the N corresponding filtered signals, and wherein each of the N adaptive filters within each bank is adapted in dependence upon the corresponding processed signal;

wherein the influence of the first sound waves is attenuated in each corresponding processed signal.

19. The system of claim 18 wherein the M×N adaptive filters includes at least one Widrow-Hoff least mean square adaptive filter.

20. The system of claim 18 wherein each of the M×N adaptive filters includes a corresponding Widrow-Hoff least mean square adaptive filter.

* * * * *